United States Patent [19]

Gudden et al.

[11] 3,980,888

[45] Sept. 14, 1976

[54] SELF-SUPPORTING LUMINESCENT SCREENS

[75] Inventors: Friedrich Gudden, Erlangen; Wolfgang Schubert, Frauenaurach; Peter Romer, Erlangen, all of Germany

[73] Assignee: Siemens Aktiengesellschaft, Munich, Germany

[22] Filed: Sept. 17, 1973

[21] Appl. No.: 396,927

[30] Foreign Application Priority Data

Sept. 28, 1972 Germany ............................ 2247524

[52] U.S. Cl. .................................. 250/483; 264/21; 427/70; 428/469; 428/917

[51] Int. Cl.² ......................... H01J 1/62; C09K 1/00

[58] Field of Search ........... 313/461, 462, 463, 464, 313/465, 466, 467; 264/21; 427/70; 250/488, 483; 428/411, 917, 469

[56] References Cited

UNITED STATES PATENTS

| | | | |
|---|---|---|---|
| 1,532,795 | 4/1925 | Balch | 117/33.5 |
| 2,588,569 | 3/1952 | Picard | 117/33.5 |
| 2,665,220 | 1/1954 | DeGier | 313/466 |

*Primary Examiner*—R. V. Rolinec
*Assistant Examiner*—Ernest F. Karlsen
*Attorney, Agent, or Firm*—V. Alexander Scher;

[57] ABSTRACT

Self-supporting luminescent screens made by applying a releasing agent to the surface of a mechanical supporting structure, having the desired shape, which agent is bound with a binding substance that is volatile at the evaporating temperature of a luminescent screen material, the latter being then deposited in a layer by evaporation onto the prepared supporting surface, until the deposited screen layer reaches a desired thickness, and eventually separating and removing the produced luminescent screen from the supporting structure.

6 Claims, 6 Drawing Figures

SELF-SUPPORTING LUMINESCENT SCREENS

Figure 1:
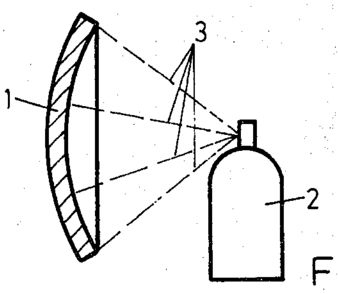
Figure 2:
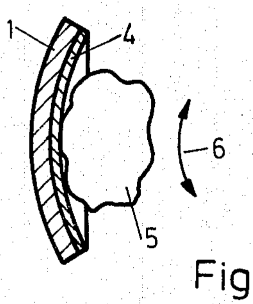
Figure 3:
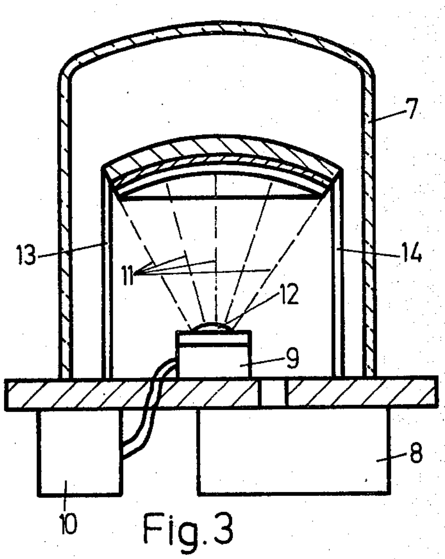
Figure 4:
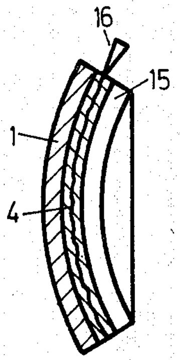

This invention relates to self-supporting luminescent screens and a process for producing them. They consist essentially of an appropriately shaped part which consists of a luminescent substance. Screens of this type are required primarily in vacuum image converters in which the images carried by invisible bundle rays of very short wave lengths, such as gamma rays, X-rays or other high energy photons, are made visible by firstly converting them in this scintillating luminescent screen into optical photons, which then cause the emission of electrons from a photo-cathode layer that overlies the said scintillating screen; these electrons are then accelerated and electron-optically focused on another fluorescent screen and thus made visible or adapted to be picked up by a suitable device.

The inlet luminescent screens of image converters used for making visible isotopic rays are primarily expected to have a substantial thickness of about 5 to 10 mm. When carriers or supporting structures are used which transmit rays, such as those of aluminum, and when an alkali metal halide scintillator material, like activated cesium iodide, is used as the luminescent substance, either form changes take place in the carrier, or fissures in the luminescent layer, depending upon the thickness and firmness of the supporting aluminum layers, which detrimentally affect image representation, since they produce distortions or lead to discontinuities in the photo-cathode layer.

For these reasons attempts have been made to provide the carrier and the luminescent layer with the same expansion coefficient by making the carrier of a material which is the basic substance of the luminescent material. However, it is difficult to produce such carriers particularly for image amplifiers since they have curved outer surfaces and as a rule have substantial diameters.

An object of the present invention is to provide luminescent screens of the described type that produce better results.

In the accomplishment of the objectives of the present invention it was found desirable to provide a carrier, having the desired form with a releasing agent which is bound with a binding compound that is volatile at the evaporating temperature of the luminescent material. The luminescent substance is then deposited on the thus prepared surface by evaporation until the desired thickness is provided. In this manner the luminescent screen can be separated from the carrier and is completed in a single vapor-depositing process. Furthermore, it is possible to eliminate separate supporting means which can produce stray rays and which absorbs without producing images.

According to an exemplary embodiment of the present invention, the substance used for facilitating the detachment of the luminescent screen from the supporting structure may be graphite used as a releasing agent which is suspended in butyl acetate serving as a solvent for nitrocellulose that is used as a volatile binder. The term volatile indicates that the binder vanishes by evaporation, cambustion or any other phenomenon when the luminescent material is deposited by evaporation, onto the supporting structure that is covered by the releasing agent. The concentration of the binder amounts to a few percents of the mixture.

The application of this suspension upon the carrier or supporting structure is very simple when this mixture is located in a spray can from which it can be dispensed by a propellant gas. After the mixture has dried, the surface may be polished with a cotton pad, thereby providing a very uniform distribution and a very smooth outer surface of the graphite. A layer of about 0.02 mm. thickness of the releasing agent is usually adequate so that after evaporating the luminescent material the screen can be easily separated from the carrier which later may consist of aluminum.

When it is necessary that the side directed toward the carrier is a reflecting surface, the presence of graphite therein may be detrimental. An improvement is provided in a simple manner when a reflecting agent, such as a metal, for example nickel, is applied upon the graphite layer. The metal can be applied by vapor deposition in a layer having a thickness of 0.1 $\mu$m.

However, it is also possible to use a reflecting pigment as the reflecting layer and apply it jointly with a binder that is stable at the applied evaporating temperature. This provides effectively a separation of the reflecting surface of the luminescent screen from the graphite used as the releasing agent.

The invention will become better understood from the following detailed description when taken in connection with the accompanying drawing showing preferred embodiments of the inventive idea by way of examples.

Figure 5:
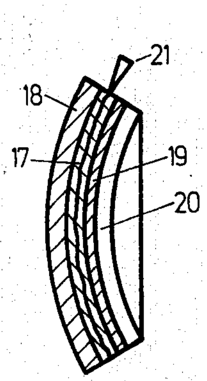
Figure 6:
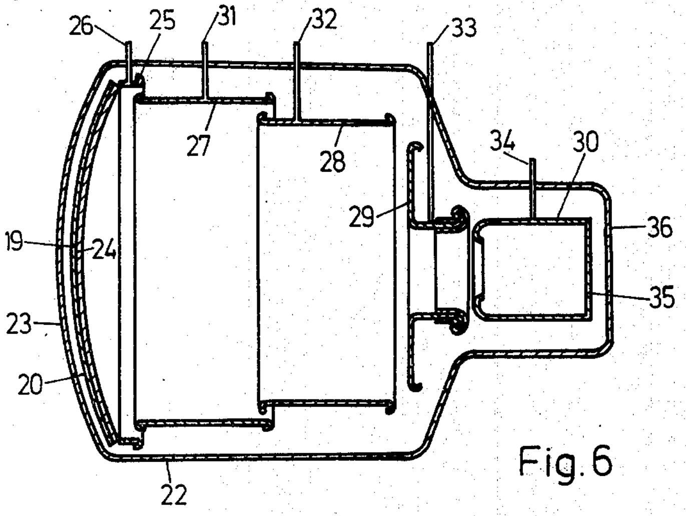

In the drawing:

FIGS. 1 to 5 are schematic illustrations of the various stages of the manufacture of the luminescent screens of the present invention; and FIG. 6 is a section through a vacuum image amplifier using the luminescent screens of the present invention.

FIG. 1 shows a carrier 1 consisting of aluminum and having the shape of a spherical cup with a thickness of 0.5 mm. A sprayer 2 sprays a releasing agent, essentially consisting of graphite, upon the comcavely curved inner surface of the carrier 1, as indicated by broken lines 3. When a mixture comprising the releasing agent, a solvent and a binder is spread on the carrier 1 and has dried as a layer 4 upon the carrier 1, it is polished by a wad 5 of cotton, as indicated by a double arrow 6 in FIG. 2. This produces a very smooth outer surface.

The carrier is then placed inside a vacuum bell or hood 7 (FIG. 3) which is evacuated by a pump 8. An evaporator 9 supplied with heater current from a current source 10 evaporates a luminous substance 12 consisting of activated cesium iodide, that is deposited upon the free outer surface of the layer 4, as indicated by broken lines 11. The rotating carrier cup 1 is held at a distance from the evaporator source 9 by supports two of which are visible in FIG. 3 and indicated by numerals 13 and 14.

After the deposition by evaporation has been carried out and during cooling a vacuum-deposited luminescent screen 15 (FIG. 4) is separated from the layer 4. This screen is removed after the hood 7 has been aired. As indicated by a wedge 16 the screen 15 is removed from the carrier 1. The layer 4 with the releasing agent is somewhat exaggerated in FIG. 4 to indicate at least partial separation.

FIG. 5 shows that in addition to a releasing agent layer 17 upon a carrier 18 (which respectively correspond to the layer 4 and the carrier 1), an optional reflecting layer 19 of nickel has been deposited by evaporation, having a thickness of 0.1 $\mu$m, prior to the application of the luminescent material, namely a layer 20 (corresponding to screen 15), which has a thickness of 5 to 10 mm. In this case also, as indicated by a wedge 21, the releasing layer 17 allows easy separation of the luminescent screen 20, with the reflecting layer 19, from the carrier 18. It should be noted from FIGS. 4 and 5 that part of the layer 17 may remain adhered to the screen 20 (or, 4 to 15) while the rest remains with the carrier 18 (1).

As shown in FIG. 6, the screen (e.g. 15, 20) prepared in the abovedescribed manner is built into a vacuum envelope 22 of an image amplifier wherein it is located behind an inlet window 23, the screen structure being here identified by numerals 19 and 20 (reflecting layer and luminescent screen). Then an optional actual photo-cathode layer 24, consisting of $SbCs_3$, is applied upon the free outer surface of the luminescent screen 20. The contacting of the photo-cathode comprising the layers 19, 20 and 24, takes place by a ring 25 and a conductor 26. The photo-cathode is followed rearwards by ring-shaped electrodes 27, 28 and 29, as well as a ring-shaped anode 30, the corresponding voltages being supplied by conductors 31, 32, 33 and 34. This arrangement constitutes a well known electron optical accelerating and focusing structure.

An X-ray image that strikes the structure from the inlet 23 produces electrons in the photo-cathode layer 24, which are focused upon an outlet luminescent screen 35 by the electrodes 27 to 30. The screen 35 consists of zinc cadmium sulfide and it is excited by impinging electrons to emit out light which is proportional to the intensity of the striking electrons, so that the intensity distribution of high energy photons, like X-rays, passing through the inlet window 23 is visible through an outlet window 36.

What is claimed is:

1. Self-supporting luminescent screens devoid of carriers, produced by applying upon a temporary supporting structure, having the desired shape of the screen, a temporary layer of releasing agent bound with a binding substance that is volatile at the evaporating temperature of a luminescent material, then depositing a layer of the luminescent material by evaporation onto the prepared supporting structure, which layer constitutes a luminescent screen, until the deposited layer of luminescent material reaches a desired thickness, the front surface of said luminescent screen being on its side that is turned away from said temporary supporting structure and said temporary layer of releasing agent, and eventually removing the produced luminescent screen from said temporary supporting structure having at least a portion of said temporary layer of releasing agent thereon.

2. Luminescent screen in accordance with claim 1, further comprising a reflecting layer applied to the rear surface of the luminescent screen.

3. Luminescent screens in accordance with claim 1, further comprising a photo-cathode layer applied to said front surface of the luminescent layer.

4. Luminescent screens in accordance with claim 1, wherein said releasing agent is graphite and said binding substance is nitrocellulose.

5. Luminescent screens in accordance with claim 2, wherein the material of said reflecting layer is a metal.

6. Luminescent screens in accordance with claim 5, wherein said reflecting layer consists of a reflecting pigment combined with a binder which is stable at the evaporating temperature of said luminescent material.

* * * * *